(12) United States Patent
Srikantam et al.

(10) Patent No.: US 7,096,374 B2
(45) Date of Patent: Aug. 22, 2006

(54) METHOD AND APPARATUS FOR DEFINING AN INPUT STATE VECTOR THAT ACHIEVES LOW POWER CONSUMPTION IN DIGITAL CIRCUIT IN AN IDLE STATE

(75) Inventors: Vamsi K. Srikantam, Sunnyvale, CA (US); Thomas E. Kopley, La Honda, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 344 days.

(21) Appl. No.: 10/443,503

(22) Filed: May 21, 2003

(65) Prior Publication Data
US 2004/0236973 A1    Nov. 25, 2004

(51) Int. Cl.
*G06F 1/26* (2006.01)
(52) U.S. Cl. ............. 713/323; 713/320; 713/321; 713/322; 713/324; 713/300; 713/330; 713/340
(58) Field of Classification Search .......... 713/300, 713/320–324, 330
See application file for complete search history.

(56) References Cited

U.S. PATENT DOCUMENTS

| | | | |
|---|---|---|---|
| 6,175,245 B1 * | 1/2001 | Bowe et al. ............... 324/765 |
| 6,175,938 B1 * | 1/2001 | Hsu ........................... 714/718 |
| 6,216,246 B1 * | 4/2001 | Shau ......................... 714/763 |
| 6,449,204 B1 * | 9/2002 | Arimoto et al. ........... 365/222 |
| 6,617,916 B1 * | 9/2003 | Kurotsu .................... 327/544 |
| 6,643,166 B1 * | 11/2003 | Ting et al. ................ 365/154 |
| 6,925,002 B1 * | 8/2005 | Arimoto et al. ........... 365/222 |
| 6,940,777 B1 * | 9/2005 | Ooishi ....................... 365/226 |
| 2003/0103368 A1 * | 6/2003 | Arimoto et al. ............. 365/63 |
| 2004/0085845 A1 * | 5/2004 | Ooishi ....................... 365/226 |

OTHER PUBLICATIONS

Johnson, Mark C., "Models and Algorithms for Bounds on Leakage in CMOS Circuits", IEEE Transactions on Computer-Aided Design . . . , vol. 18, No. 6, Jun. 1999, pp. 714-725.
Halter, Jonathan P. et al., "A Gate-Level Leakage Power Reduction Method for Ultra-Low-Power CMOS Clrcuits", IEEE 1997 Custom Integrated Circuits Conference, pp. 475-478.
Guindi, Rafik et al., "Design Techniques for Gate-Leakage Reduction in CMOS Circuits", Proceedings of the Fourth Intl. Symposium on Quality Electronic Design, IEEE 2003.
Rao, Rahul M. et al., "A Heuristic to Determine Low Leakage Sleep State Vectors for CMOS Combinational Circuits", IEEE/AM Intl. Cinference on Computer Aided Design, Nov. 2003, pp. 689-692.

(Continued)

*Primary Examiner*—Abdelmoniem Elamin

(57) ABSTRACT

The method defines an input state vector that achieves low power consumption when applied to the circuit inputs of a digital circuit in an idle state. The digital circuit includes one or more circuit elements of respective circuit element types. In the method, idle power values including idle power values for each circuit element type. The idle power values for each circuit element type correspond to different states of the inputs of a circuit element of the circuit element type. Additionally the idle power values are used to determine, for each circuit element, states of the inputs of the circuit element that would set the circuit element to a lowest-allowable idle power state when the digital circuit is in the idle state. The states determined for those of the inputs that constitute the circuit inputs define the input state vector. The states are also determined accounting for the logic constraints of the digital circuit.

29 Claims, 9 Drawing Sheets

OTHER PUBLICATIONS

Naidu S. R. et al., "Minimizing Stand-By Leakage Power in Static CMOS Circuits", Design, Automation & Test in Europe, Mar. 2001,.

Abdollahi, A. et al., "Runtime Mechanisms for Leakage Current Reduction in CMOS VLSI Circuits", Low Power Electronics and Design, Aug. 2002, pp. 213-218.

Aloul, F. A. et al. "Robust SAT-based Search Algorithm for Leakage Power Reduction", Integrated Circuit Design, 2002, pp. 167-168.

Chen, Zhanping et al., "Estimation of Standby Leakage Power in CMOS Circuit . . . ", 1998 Intl Symposium on Low Power ELectronics . . . , 1998, pp. 239-244.

* cited by examiner

METHOD AND APPARATUS FOR DEFINING AN INPUT STATE VECTOR THAT ACHIEVES LOW POWER CONSUMPTION IN DIGITAL CIRCUIT IN AN IDLE STATE

RELATED APPLICATION

This application is related to a simultaneously-filed U.S. patent application Ser. No. 10/443,555 entitled Method and Apparatus for Defining an Input State Vector That Achieves Low Power Consumption in a Digital Circuit in an Idle State of inventors Thomas E. Kopley and Vamsi K. Srikantam, still pending.

BACKGROUND OF THE INVENTION

The proliferation of low-power applications has driven the need to reduce the power consumption of the circuits used in low-power devices. For example, battery life extension for portable devices, such as cell phones and computers, is of increasing concern as the density and complexity of the circuits used in these devices increases. One solution focuses on lowering the power supply and operating voltages, which requires that the threshold voltages of the transistors used in the circuits be reduced to reach performance guidelines. However, reducing the transistor threshold voltages deleteriously increases the leakage current of the transistors due to the exponential relationship between threshold voltage and leakage current. This becomes more problematic especially as power supply and operating voltages and the corresponding threshold voltages are ever reduced.

Power consumption in devices that are intermittently operated is typically reduced by configuring the circuits of such devices to operate in an idle or standby state after a period of inactivity. Such circuits consume power even in the idle state, however, so it is desirable to reduce the power consumption of the circuits in the idle state. Methods for reducing power consumption in the idle state by defining an input vector have previously been proposed, but such power consumption reduction methods do not take into account the circuit structure of the digital circuit.

In particular, previous methods propose subjecting a circuit to random input state vector generation to obtain an input state vector that, when applied to a digital circuit, results in reduced power consumption when the digital circuit is in an idle state. An example of such a method is disclosed by Halter et al. in *A Gate-Level Leakage Power Reduction Method for Ultra-Low-Power CMOS Circuits*, PROC. IEEE CUSTOM INTEGRATED CIRCUITS CONFERENCE, 475–478 (1997). However, the approach of Halter et al. does not take the circuit structure into account when determining the input state vector. In addition, at least some randomly-generated input state vectors will not actually reduce the power consumption of the digital circuit in the idle state.

Other methods propose applying a genetic algorithm and linear normalization to determine an input state vector. An example of such a method is disclosed by Chen et al. in *Estimation of Standby Leakage Power in CMOS Circuits Considering Accurate Modeling of Transistor Stacks*, PROC. IEEE & ACM INT. SYMPOSIUM ON LOW POWER ELECTRONICS & DESIGN, 239–244 (August 1998). However, the final input state vector obtained by the genetic algorithm depends largely on the initial vector set chosen. If the initial vector set is non-optimum, the resulting input state vector may not actually be the input state vector that best reduces the power consumption in the digital circuit in the idle state.

Still other methods reduce power consumption of a digital circuit in an idle state by using multiplexers to apply the input state vector to the inputs of the digital circuit. An example of this is disclosed by U.S. Pat. No. 6,081,135 of Goodnow et al., entitled *Device and Method to Reduce Power Consumption in Integrated Semiconductor Devices*. However, the addition of multiplexers to apply the input state vector increases the power consumption of the digital circuit when the circuit is in its active state. The additional multiplexers also increase the power consumption of the digital circuit in the idle state.

Therefore, there is a need for a method and apparatus for defining an input state vector that achieves low power consumption when applied to the circuit inputs of a digital circuit in an idle state. There is an additional need for a method and apparatus for defining such an input state vector that does not require changes in design methodologies and standard design cell libraries used to design the digital circuit.

SUMMARY OF THE INVENTION

The invention provides an apparatus and method for defining an input state vector that achieves low power consumption when applied to the circuit inputs of a digital circuit in an idle state. Specifically, in one embodiment, the invention provides an apparatus that defines an input state vector that achieves low power consumption when applied to the circuit inputs of a digital circuit in an idle state. The digital circuit comprises one or more circuit elements having respective circuit element types. The apparatus includes an idle power value source having stored therein idle power values including idle power values for each circuit element type. The idle power values for each circuit element type correspond to different states of the inputs of a circuit element of the circuit element type. The apparatus also includes an idle power assessor that uses the idle power values to determine states of the inputs of each circuit element that would set the circuit element to a lowest-allowable idle power state when the digital circuit is in the idle state. The idle power assessor accounts for logic constraints of the digital circuit in determining the lowest-allowable idle power state of each circuit element. The states determined for those of the inputs that constitute the circuit inputs define the input state vector.

In another embodiment, the invention provides a method for defining an input state vector that achieves low power consumption when applied to the circuit inputs of a digital circuit in an idle state. The digital circuit comprises one or more circuit elements of respective circuit element types. In the method, stored idle power values including idle power values for each circuit element type are accessed. The idle power values for each circuit element type correspond to different states of the inputs of a circuit element of the circuit element type. Additionally, for each circuit element comprising the digital circuit and from the stored idle power values states, states of the inputs of the circuit element are determined that would set the circuit element to a lowest-allowable idle power state when the digital circuit is in the idle state. The determining accounts for logic constraints of the digital circuit. The states determined for those of the inputs that constitute the circuit inputs define the input state vector.

In another embodiment, the invention provides a computer-readable medium in which are stored computer-readable instructions that cause a computer to perform a method for defining an input state vector that achieves low power consumption when applied to the circuit inputs of a digital circuit in an idle state. The digital circuit comprises one or more circuit elements of respective circuit element types. In the method, the computer accesses stored idle power values that include idle power values for each circuit element type. The idle power values for each circuit element type correspond to different states of the inputs of a circuit element of the circuit element type. Also in the method, the computer determines from the stored idle power values, for each circuit element comprising the digital circuit, states of the inputs of the circuit element that would set the circuit element to a lowest-allowable idle power state when the digital circuit is in the idle state. The determining performed by the computer in response to the computer-readable instructions accounts for logic constraints of the digital circuit. The states determined for those of the inputs that constitute the circuit inputs define the input state vector.

Accordingly, embodiments according to the invention meet the need to determine an input state vector that, when applied to the circuit inputs of a digital circuit, achieves low power consumption when the digital circuit is in an idle state. Embodiments according to the invention additionally determine such an input state vector without requiring a change in design methodologies or standard design cell libraries used in the digital circuit. Embodiments according to the invention determine such an input state vector taking into account the structure and logic constraints of the digital circuit. Embodiments of the invention determine such an input state vector using characterizations of the circuit elements of the digital circuit under real, dynamic operating conditions.

DETAILED DESCRIPTION OF THE INVENTION

Figure 1:
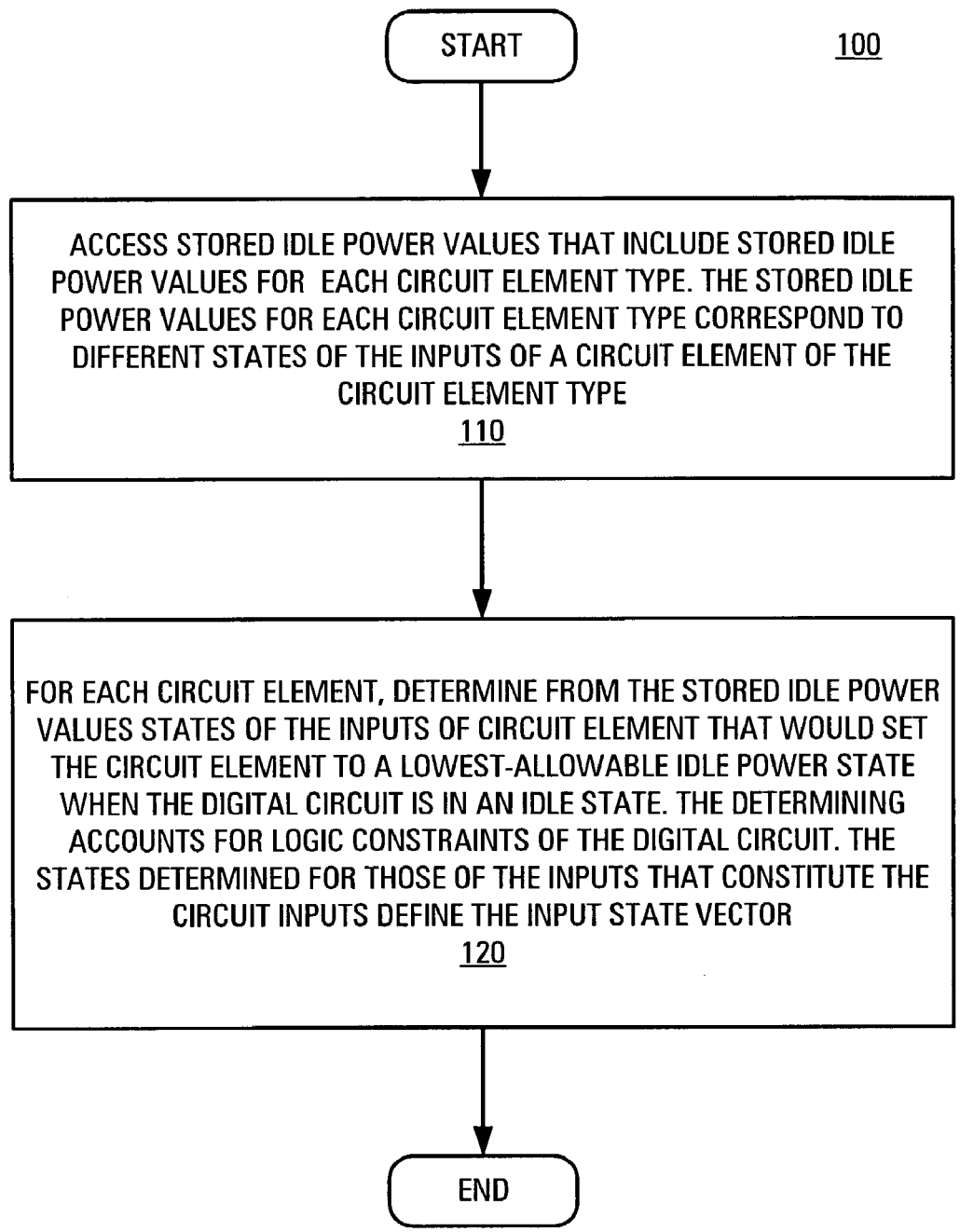
FIG. 1 is a flow diagram illustrating an embodiment of a method in accordance with the invention for determining an input state vector that achieves low power consumption when applied to the circuit inputs of a digital circuit in an idle state.

Embodiments of the invention define an input state vector for application to the circuit inputs of a digital circuit in an idle state. Applying the input state vector determined by the invention to the circuit inputs achieves low power consumption when the digital circuit is in the idle state. The input state vector is composed of an input state, i.e., a zero state or a one state, for each of the inputs of the digital circuit.

The digital circuit for which the input state vector is defined is composed of one or more circuit elements. The circuit elements have respective circuit element types, e.g., AND gate, OR gate, NAND gate, etc. While the digital circuit may be composed of circuit elements of a single circuit element type, e.g., the digital circuit may be composed entirely of AND gates, a typical digital circuit is composed of circuit elements of several different circuit element types, e.g., the digital circuit may be composed of different numbers of AND gates, OR gates, NAND gates, etc.

As used in this disclosure, the term digital circuit encompasses digital circuits ranging in complexity from a digital circuit composed of a single circuit element of one circuit element type to a digital circuit composed of many circuit elements of many circuit element types. A digital circuit will be regarded as being in an idle state when it remains powered up, but is otherwise not operating. The term circuit input will be used to denote an input of the digital circuit. The term input used alone will be used to denote the input of a circuit element.

An embodiment of a method in accordance with the invention accesses stored idle power values indicating how much power a circuit element of particular circuit element type, e.g., an AND gate, an OR gate, a NAND gate, etc. consumes when in an idle state and when having various input states applied to its physical inputs. Using the stored idle power values, the method determines, for each circuit element of the digital circuit, input states that would set the circuit element to a lowest-allowable idle power state when the digital circuit is in the idle state. As will be described below, the determination of the input states of the circuit element also considers the logic constraints of the digital circuit. As a result, the lowest-allowable idle power state may not be the lowest-possible idle power state, because setting the circuit element to the lowest-possible idle power state may be forbidden by the logic constraints. The input states determined for the circuit elements whose inputs are the circuit inputs collectively constitute the input state vector. When applied to the circuit inputs of the digital circuit in the idle state, the input state vector sets the circuit elements to their respective least-allowable idle power states. Thus, applying the input state vector to the circuit inputs when the digital circuit is in the idle state achieves low power consumption in the digital circuit.

The term "low power consumption" is intended to indicate that the power consumed by the digital circuit in the idle state is less than that which would be consumed by the digital circuit in the idle state if the input state vector were not applied. It should be noted, however, that the term "low power consumption" does not necessarily indicate that the lowest-possible power consumption is achieved by the digital circuit in the idle state.

FIG. 1 is a flow diagram illustrating a method 100 in accordance with one embodiment of the invention for determining an input state vector that achieves low power consumption when applied to the circuit inputs of a digital circuit in an idle state. At 110, stored idle power values are accessed. The stored idle power values include idle power values for each of the circuit element types of the one or more circuit elements that comprise the digital circuit. The idle power values for each circuit element type correspond to different states of the inputs of a circuit element of the circuit element type. More specifically, the idle power values include an idle power value for each of the possible combinations of states that can be applied to the inputs of a circuit element of the circuit element type. For example, for a circuit element type that has two inputs, four possible combinations of states can be applied to the inputs of a circuit element of that circuit element type. Specifically, for a circuit element type having two inputs, the possible combinations of the states A and B that can be applied to the inputs are as follows: (A=0, B=0); (A=0, B=1); (A=1, B=0); and (A=1, B=1). As a result, four idle power values are stored for each two-input circuit element type.

Table 1 below shows idle power values for an exemplary two-input NAND gate calculated using a static simulation and a dynamic simulation. The exemplary two-input NAND gate is designed for a 0.25 μm CMOS process and operation at 1.8 V. For the dynamic simulation, the exemplary two-input NAND gate operates at 50 MHz. In the static simulation, prior activity of the circuit element is not considered when determining the idle power value. The states of the inputs (i.e., input states) of the two-input NAND gate are held constant throughout the simulation and the idle power values are calculated using SPICE simulations. Alternatively, the idle power values may be determined by measuring samples of the circuit elements with the different combinations of input states applied to the inputs of the samples. Idle power values determined by a static simulation or static measurement will be called static idle power values.

In the dynamic simulation, the idle power values are dependent on the previous activity of the circuit element. Hence, the dynamic simulation characterizes the circuit element under conditions more similar to real operating conditions. In the dynamic simulation, different combinations of input states are serially applied to the inputs of the circuit element at a rate of 50 MHz. Then, the combination of inputs shown in the table is statically applied to the inputs of the circuit element and respective idle power values are determined. In a simulation, the idle power values are determined by calculation. Alternatively, the idle power values may be determined by measuring samples of the circuit elements. Idle power values determined by a dynamic simulation or dynamic measurement will be called dynamic idle power values.

Table 1 shows that dynamic idle power values can be quite different from static idle power values. This is because intermediate nodes of the circuit element are set at intermediate voltages when the circuit element is active. When the circuit element is put into an idle state, these intermediate voltages determine the current that initially flows in the idle state. Under real operating conditions, an input state vector defined using dynamic idle power values will typically result in a different power consumption in the idle state than one defined using static idle power values. Dynamic idle power values should be used to determine the input state vector for a circuit that is put into the idle state for relatively short periods of time.

Table 1 (below) indicates that input states of (A=0, B=0) provide the lowest static or dynamic simulation idle power value for the two-input NAND gate.

TABLE 1

Simulated Static and Dynamic Idle Power Values for 2-Input NAND Gate

| Input States | Static Idle Power Value (pW) | Dynamic Idle Power Value (pW) |
|---|---|---|
| A = 0, B = 0 | 128 | 75 |
| A = 0, B = 1 | 537 | 575 |
| A = 1, B = 0 | 460 | 4,548 |
| A = 1, B = 1 | 161 | 5,621 |

Returning to FIG. 1, at 120, input states are determined for each circuit element using the stored idle power values for the circuit element type of the circuit element. The input states determined are those that would set the circuit element to a lowest-allowable idle power state when the digital circuit is in the idle state. However, for each circuit element, the available choices for the input states are constrained by the logic constraints of the digital circuit. From the available choices, the input states are chosen that would set the circuit element to the lowest-allowable idle power state when the digital circuit is in the idle state. For example, if input states of (A=0, B=0) do not comply with the logic constraints of the digital circuit, then the input states giving the next-lowest idle power state are chosen until the logic constraints are satisfied. The input states determined for those of the inputs that constitute the circuit inputs define the input state vector.

In one embodiment of a method in accordance with the invention, the input state vector is determined by performing a forward determination. A forward determination begins by determining the input states of the circuit elements closest to the circuit inputs, and then works through the digital circuit in a forward direction along a path extending away the circuit inputs X, Y and $C_{in}$. A forward determination can be performed on the entire digital circuit or on a subset of a larger digital circuit. In one such approach, the forward determination begins with determining input states for circuit elements whose inputs constitute a subset of the circuit inputs of the larger digital circuit.

Figure 2:
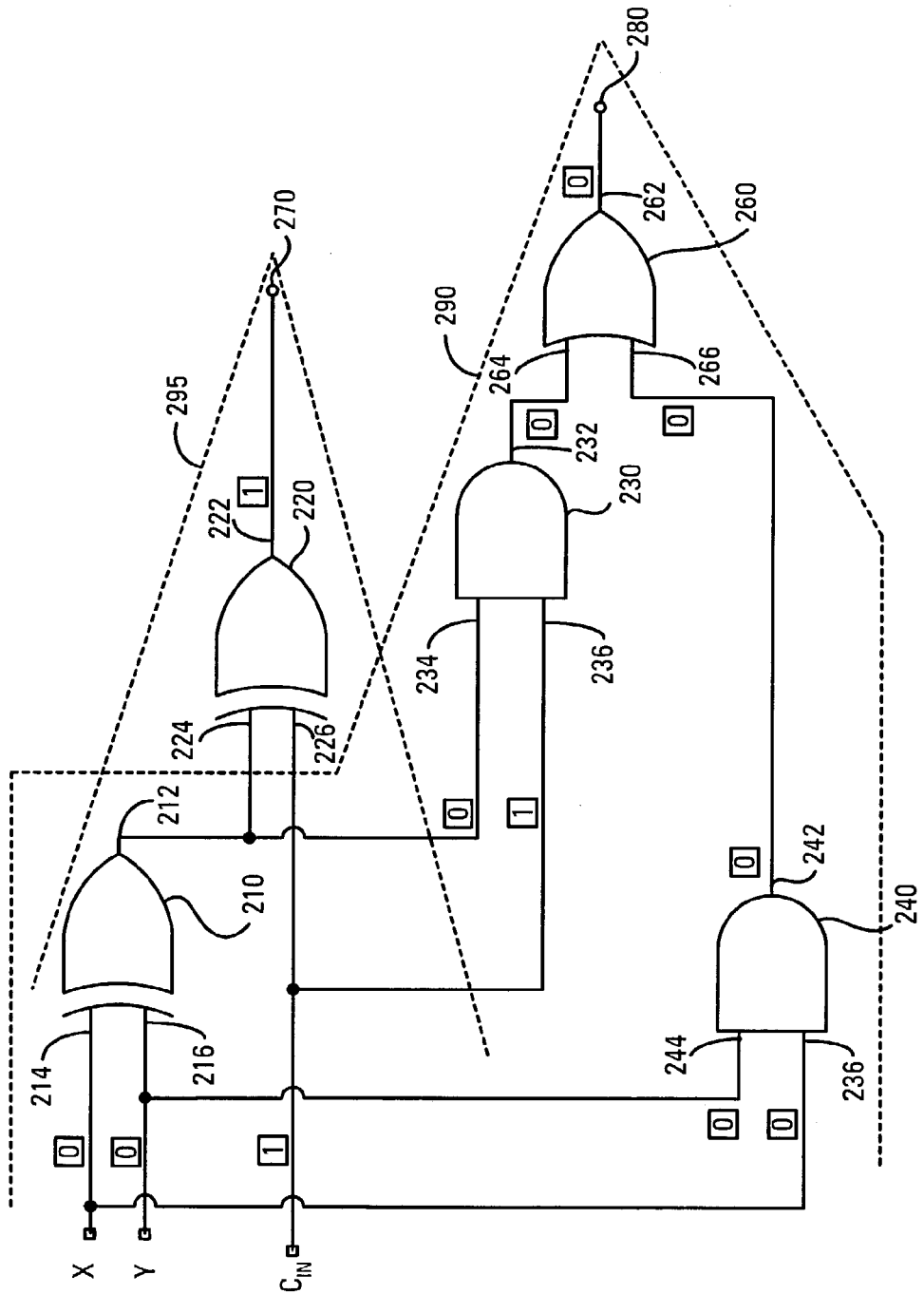
FIG. 2 is a schematic diagram of an exemplary digital circuit for which an input state vector is defined by a method in accordance with the invention in which the states of the inputs of the circuit elements are determined working through the digital circuit along a path that extends away from the circuit inputs.

FIG. 2 is a schematic diagram of an exemplary digital circuit 200 that will be used to illustrate the use of an embodiment of the method 100 described above with reference to FIG. 1 to determine an input state vector by performing a forward determination, as described above. Exemplary digital circuit 200 is an adder circuit comprised of circuit elements 210, 220, 230, 240, and 260 electrically interconnected as shown. Digital circuit 200 includes circuit inputs X, Y and $C_{in}$ and circuit outputs 270 and 280. Digital circuit 200 is composed of five circuit elements of three circuit element types, i.e., two two-input XOR gates 210 and 220, two two-input AND gates 230 and 240, and one two-input OR gate 260. Digital circuit 200 is merely an example of a digital circuit for which an input state vector can be determined using the below-described embodiment of the method 100: method 100 can be used to determine an input state vector for any digital circuit comprised of any number of circuit elements of any number of circuit element types with any number of inputs, e.g., one, two, or more inputs and fabricated by any fabrication process.

The circuit elements of adder circuit 200 are of three circuit element types, namely, XOR gate (XOR gates 210 and 220), AND gate (AND gates 230 and 240), and OR gate (OR gate 260). Simulations are performed on circuit elements of the three circuit element types to find the idle power values for each possible combination of states of the inputs of the circuit elements. The idle power values shown in Table 2 for each of the circuit element types of digital circuit 200 are dynamic idle power values obtained by dynamic simulation of the respective circuit elements. It should be noted that the dynamic idle power values shown in Tables 1 and 2 are typical values, since the dynamic idle power values depend in part on the conditioning applied to the inputs of the circuit element before the idle power values are calculated or measured.

TABLE 2

| | Dynamic Idle Power Values | | |
| --- | --- | --- | --- |
| Input States | Idle Power Value XOR (pW) | Idle Power Value OR (pW) | Idle Power Value AND (pW) |
| A = 0, B = 0 | 704 | 16,680 | 34,810 |
| A = 0, B = 1 | 28,910 | 9,102 | 28,870 |
| A = 1, B = 0 | 724 | 550 | 15,590 |
| A = 1, B = 1 | 11,620 | 6,185 | 7,250 |

To begin the forward determination, one of circuit elements 210 or 240 is selected. Circuit elements 210 and 240 are the circuit elements closest to circuit inputs X, Y and $C_{in}$ of the digital circuit. In this example, inputs 214 and 216 of circuit element 210 and input 226 of circuit element 240 constitute the circuit inputs X, Y and $C_{in}$, respectively, of digital circuit 200. Using the stored idle power values, input states that provide the lowest-allowable idle power value of the selected circuit element are determined. For example, XOR gate 210 is selected and the input states that, when applied to inputs 214 and 216 of XOR gate 210 provide the lowest-allowable idle power value for circuit element 210 are chosen as the input states for circuit element 210. Alternatively, AND gate 240 could be selected as the first circuit element whose input states are determined.

For XOR gate 210, four possible combinations of input states can be applied to inputs 214 and 216. Specifically, input state combinations of (A=0, B=0); (A=1, B=0); (A=0, B=1) and (A=1, B=1) can be applied. Since XOR gate 210 is the first circuit element whose input states are determined in the forward determination, no logic constraints exist on the input states that can be applied to XOR gate 210. Consequently, the lowest-allowable idle power value is the lowest-possible idle power value. Table 2 shows that, of the four input state combinations available, the input state combination giving the lowest-possible idle power value is (A=0, B=0). The method therefore selects the input states (A=0, B=0) as the input states of XOR gate 210. Such input states applied to the inputs 214 and 216 of XOR gate 210 set the output 212 of XOR gate 210 to a state of 0.

Continuing with the forward determination, the input states for AND gate 230 are determined. Table 2 shows that, of the four available input state combinations (A=0, B=0); (A=1, B=0); (A=0, B=1) and (A=1, B=1), the input state comb (A=1, B=1) gives the lowest idle power value. However, the method accounts for the logic function of XOR gate 210 by requiring that the output 212 of XOR gate 210, which is connected to input 234 of AND gate 230, have a state of 0. Consequently, the allowable input state combinations for AND gate 230 must have an input state of (A=0). Table 2, shows that the input state combination that gives the lowest idle power value is (A=1, B=1). However, such an input state combination does not comply with the logic constraints of digital circuit 200. Of the two available input state combinations (A=0, B=0) and (A=0, B=1) that do comply with the logic constraints of the digital circuit, Table 2 shows that the input state combination (A=0, B=1) gives the lowest-allowable idle power value. Thus, the method selects an input state of 1 for application to the input 236 of AND gate 230. Such selected input states applied to the inputs 234 and 236 of AND gate 230 set the output 232 of AND gate 230 to a state of 0.

The forward determination next determines the input states for OR gate 260. As described above, logic constraints of the digital circuit 200 require the output 232 of AND gate 230 to have a state of 0. Because the inputs 244 and 246 of AND gate 240 are also connected to the inputs 214 and 216 of XOR gate 210, the method now determines that the input states for the inputs 244 and 246 of AND gate 240 are (A=0, B=0). Such input states applied to the inputs of AND gate 240 set the output 242 of AND gate 240 to a state of 0. The output 242 of AND gate 240 is connected to the input 266 of OR gate 260 and the output 232 of AND gate 230 is connected to the input 264 of OR gate 260. Input states of (A=0, B=0) applied to the inputs 264 and 266 of OR gate 260 set the output 262 of OR gate 260 to a state of 0.

The forward determination next determines the input states for XOR gate 220. The input states that have already been determined for the inputs 214 and 216 of XOR gate 210 set the output 212 of XOR gate 210 to a state of 0. Also, the input 226 of XOR gate 220 is connected to the input 234 of AND gate 230, which has previously been determined to have a state of 1. Thus, the input states for the inputs 224 and 226 of XOR gate 220 are already defined as 0 and 1, respectively. Input states of 0 and 1 applied to the inputs 224 and 226 of XOR gate 220 cause the output 222 of XOR gate 220 to have a state of 1.

The inputs 214 and 216 of XOR gate 210 are connected to circuit inputs X and Y, respectively. The input 226 of XOR gate 220 is connected to circuit input $C_{in}$. The input states of inputs 214, 216 and 226 are determined by the above-described forward determination to be 0, 0 and 1, respectively. Thus, the forward-determined input state vector determined by the forward determination just described has states of (X=0, Y=0, $C_{in}$=1). Application of the forward-determined input state vector to the circuit inputs of digital circuit 200 achieves low power consumption when digital circuit 200 is in an idle state. Furthermore, the method accounts for logic constraints of digital circuit 200 during the determination of the input state vector. In addition, when logic conflicts arise at a particular circuit element, input states that give the next-lowest idle power value and that avoid the logic conflict are assigned to the circuit element.

When performing the forward determination just described, and as a consequence of selecting the circuit element at which the forward determination begins, digital circuit 200 may be divided into segments and the forward determination may be performed on the segments in turn. For example, when XOR gate 210 is selected as the circuit element at which the forward determination begins, input states for all the circuit element located in one segment, segment 290, may be determined before input states for the remaining circuit elements of digital circuit 200 are determined. The circuit elements belonging to a given segment depends on the logical coupling of the circuit elements. For example, because output 212 of XOR gate 210 is connected to input 234 of AND gate 230, it may be desirable or efficient to determine the appropriate input states for AND gate 230 after first determining the input states for XOR gate 210. Similarly, because the output 232 of AND gate 230 is connected to input 264 of OR gate 260, it may be desirable to next determine the input states for OR gate 260. Due to such electrical interconnection of the circuit elements comprising digital circuit 200, the segmentation just described may be a natural consequence of, or a desired approach to, determining the input state vector for digital circuit 200.

In one embodiment, two segments, segment 290 and segment 295, logically evolve during the forward determination of the input state vector. Segment 290 and segment 295 are referred to as fan-in cones. Although such segmentation may occur in the present embodiment, the other embodiments of the invention can determine the input states for circuit elements of the digital circuit using various other types of segmentation. For example, any subset of inputs that control a subset of the outputs can be regarded as a segment. In another example, a fan-in cone can be divided into sub-fan-in cones. Thus, the invention is not limited to determining the input states of the circuit elements of a digital circuit segmented according to any particular approach or even to requiring that segmentation occur at all.

Another embodiment of method 100 determines the input state vector by performing a backward determination in which the input states of the circuit elements are determined working backwards through digital circuit 200 along a path that extends towards circuit inputs X, Y and $C_{in}$. A backward determination begins by determining input states of circuit elements closest to the circuit outputs 270 and 280 and then working backwards through the digital circuit along a path that extends towards the circuit inputs. The backward determination determines an input state vector that achieves low power consumption when applied the digital circuit in an idle state.

Figure 3:
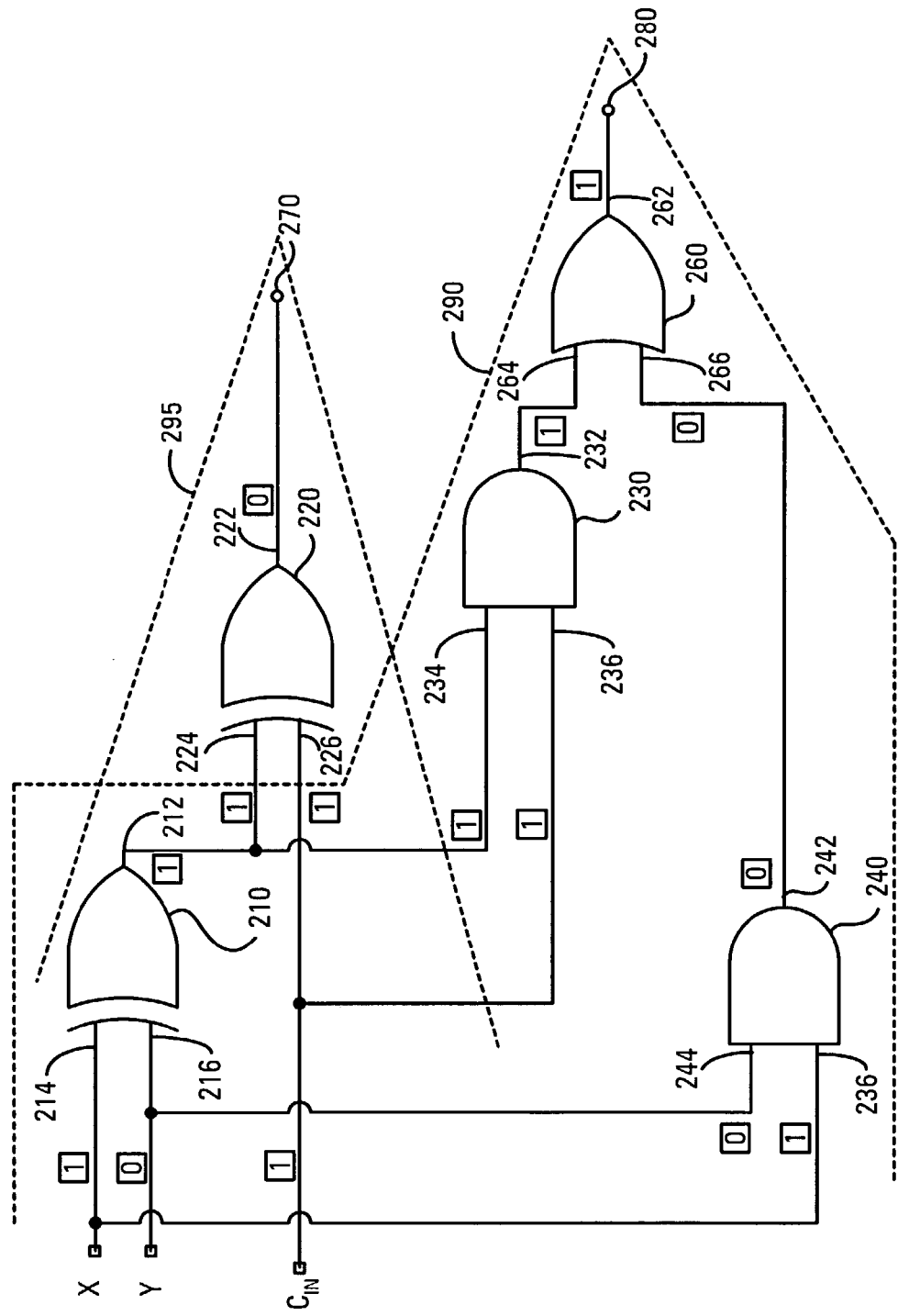
FIG. 3 is a schematic diagram of an exemplary digital circuit for which an input state vector is defined by a method in accordance with the invention in which the states of the inputs of the circuit elements are determined working through the digital circuit along a path that extends towards the circuit inputs.

FIG. 3 is a schematic diagram of the above-described exemplary digital circuit 200 that will be used to illustrate a backward determination performed by another embodiment of the method 100 described above with reference to FIG. 1. Although FIG. 3 shows a circuit composed of five circuit elements of three circuit element types in which all of the circuit element types are two-input circuit element types, other embodiments of the method according to the invention can define an input state vector for digital circuits comprised of any number of circuit elements of any number of circuit element types with any number of inputs, e.g., one, two, or more inputs, fabricated using any fabrication process.

The backward determination first determines the input states for OR gate 260. OR gate 260 and XOR gate 220 are the circuit elements of digital circuit 200 closest to outputs 270 and 280. The backward determination could alternatively have started XOR gate 220. Because OR gate 260 is the first circuit element whose input states are determined, no logic constraints need be considered when determining appropriate input states. Thus, four input state combinations are available for OR gate 260. The four input state combinations are: (A=0, B=0); (A=1, B=0); (A=0, B=1); (A=1, B=1). Table 2 shows that, of the four input state combinations available, the input state combination giving the lowest idle power value is (A=1, B=0). With such input states applied to the inputs 264 and 266 of OR gate 260, the output 262 of OR gate 260 has a state of 1.

The backward determination next determines the input states for AND gate 230. Table 2 shows that, of the four available input state combinations, the input state combination of (A=1, B=1) results in the lowest idle power value. However, the backward determination accounts for the logic function of OR gate 260 by realizing that the output 232 of AND gate 230, which is connected to the input 264 of OR gate 260, has been previously determined to have an input state of 1. Thus, the input states for AND gate 230 must be ones that set output 232 to a state of 1. Only input states of (A=1, B=1) applied to the inputs 234 and 236 of AND gate 230 will set output 232 to a state of 1. Thus, the backward determination determines input states (A=1, B=1) for the inputs 234 and 236 of AND gate 230.

The backward determination next determines input states for XOR gate 210 and AND gate 240. Output 212 of XOR gate 210 must have a state of 1, as this output is connected to input 234 of AND gate 230. Accounting for the logic function of XOR gate 210, the backward determination determines that the allowable input states for XOR gate 210 are (A=0, B=1) or (A=1, B=0). Table 2 shows that input states of (A=1, B=0) result in a lower idle power value. Thus, the backward determination determines input states (A=1, B=0) for the inputs 214 and 216 of XOR gate 210.

Because the inputs 214 and 216 of XOR gate 210 are connected to the inputs 244 and 246, respectively, of AND gate 240, the backward determination determines input states of (A=1, B=0) for the inputs 244 and 246 of AND gate 240. In addition, the backward determination previously determined input states (A=1, B=1) for the inputs 224 and 226 of XOR gate 220. Input states (A=1, B=1) applied to the inputs of XOR gate 220 set the output 222 of XOR gate 220 to a state of 0.

The inputs 214 and 216 of XOR gate 210 are connected to circuit inputs X and Y, respectively. The input 226 of XOR gate 220 is connected to circuit input $C_{in}$. The input states of inputs 214, 216 and 226 are determined by the above-described backward determination to be 1, 0 and 1, respectively. Thus, the backward-determined input state vector determined by the above-described backward determination has states of (X=1, Y=0, $C_{in}$=1). Application of the backward-determined input state vector to the circuit inputs of digital circuit 200 achieves low power consumption when digital circuit 200 is in an idle state. Furthermore, the backward determination accounts for logic constraints of digital circuit 200 during the determination of the input state vector. In addition, when logic conflicts arise at a particular circuit element, the input state combination giving the next-lowest idle power value and that avoids the logic conflict is assigned to the circuit element.

Figure 4:
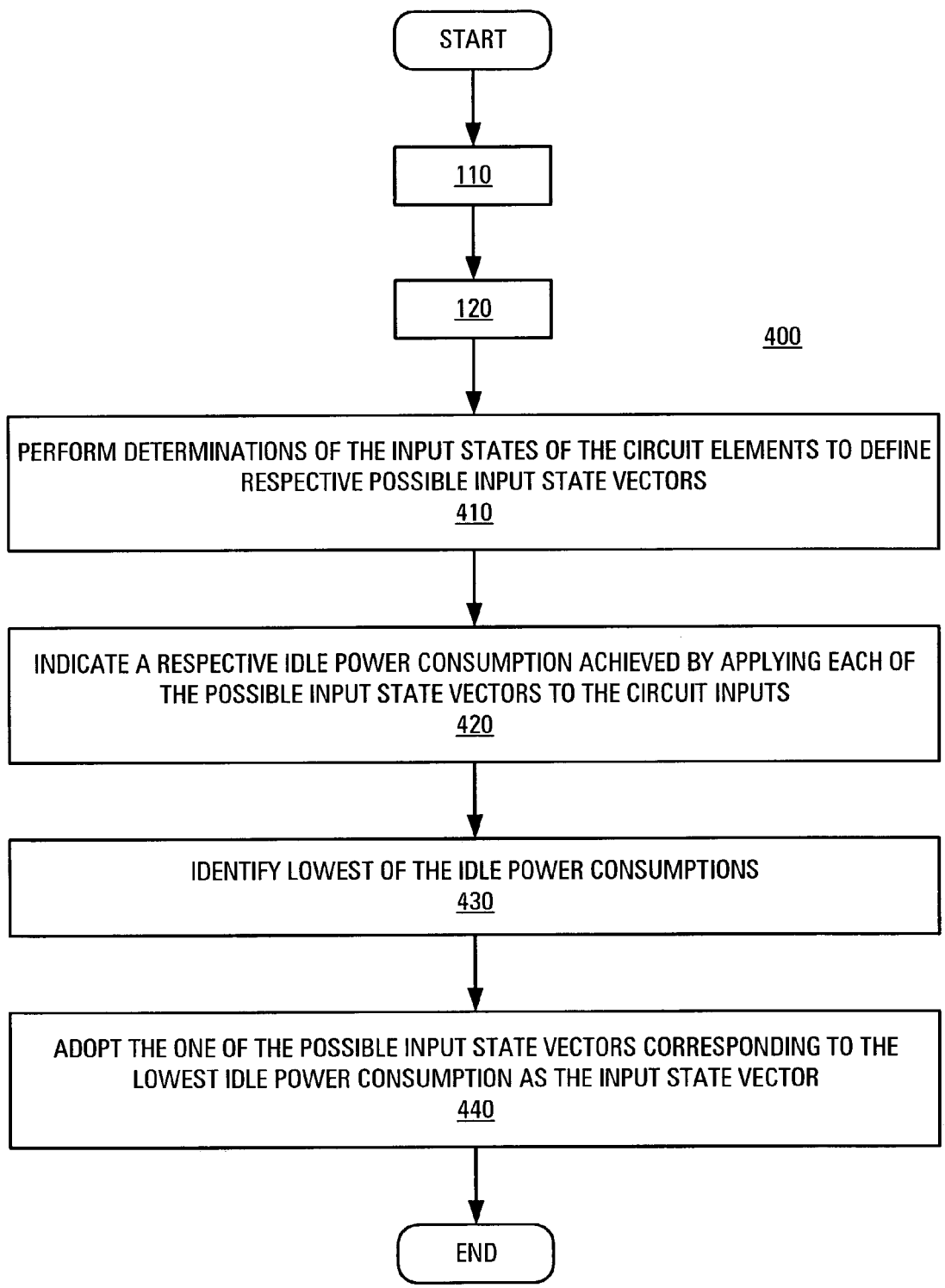
FIG. 4 is a flow diagram illustrating an embodiment of a method in accordance with the invention that performs determinations of the states of the inputs of the circuit elements to define respective possible input state vectors and adopts as the input state vector the possible input state vector that gives the lowest idle power consumption.

FIG. 4 is a flow diagram illustrating a second embodiment 400 of a method in accordance with the invention for determining an input state vector for a digital circuit that achieves low power consumption when applied to the circuit inputs of the digital circuit in an idle state. In method 400, possible input state vectors are determined for the digital circuit and the one of the possible input state vectors that achieves the lowest power consumption when applied to the circuit inputs of the digital circuit in an idle state is adopted as the input state vector for the digital circuit. Elements of method 400 that correspond to elements of method 100 described above with reference to FIG. 1 are indicated using the same reference numerals and will not be described again here.

In block 410, determinations of the input states of the digital circuit elements are performed to define respective possible input state vectors.

In block 420, respective idle power consumptions achieved by applying each of the possible input state vectors to the circuit inputs of the digital circuit are indicated. Each idle power consumption may be indicated by summing the idle power values of the circuit elements that comprise the digital circuit in response to the respective possible input state vector applied to the circuit inputs. Various other methods for indicating the idle power consumptions can alternatively be implemented. Such various methods include, but are not limited to, direct measurement and the application of circuit simulations such as a SPICE simulation.

In block 430, the lowest of the idle power consumptions is identified.

In block 440, the one of the possible input state vectors that corresponds to the lowest idle power consumption is adopted as the input state vector for subsequent application to the circuit inputs of the digital circuit in an idle state. The possible input state vector adopted as the input state vector depends on which of the idle power consumptions was identified as the lowest idle power consumption in block 430.

In an example of method 400 in which two determinations of the states of the inputs of the circuit elements are performed, in block 410, a forward determination described above with reference to FIG. 2 is performed as one of the determinations. The forward determination defines a first possible input state vector. In the forward determination, the input states of the circuit elements are determined working forward through the digital circuit along a path that extends away from the circuit inputs. Using the example of the adder circuit 200 shown in FIG. 2, the first possible input state vector determined by such forward determination is, (X=0, Y=0, and $C_{in}$=1).

Additionally, in block 410, a backward determination described above with reference to FIG. 3 is performed as the other of the determinations of the states of the inputs of the circuit elements. The backward determination defines a second possible input state vector. In the backward determination, the input states of the circuit elements are determined working backward through the digital circuit along a path that extends towards the circuit inputs. Using the example of the adder circuit 200 shown in FIG. 3, the second possible input state vector determined by such backward determination is (X=1, Y=0, and $C_{in}$=1).

In a quantitative example of the idle power consumption indications performed in block 420 when method 400 is applied to the digital adder circuit 200 shown in FIGS. 2 and 3, the first idle power consumption obtained when the first possible input state vector determined by the forward determination is applied to the circuit inputs of digital circuit 200 is calculated as follows:

$$P_{(First\_IPC)} = 704 + 28,910 + 28,870 + 34,810 + 16,680 \text{ pW}$$
$$= 109,970 \text{ pW}.$$

The second idle power consumption obtained when the second possible input state vector determined by the backward determination is applied to the circuit inputs of digital circuit 200 is calculated as follows:

$$P_{(Second\_IPC)} = 724 + 11,620 + 7,250 + 28,870 + 550 \text{ pW}$$
$$= 49,000 \text{ pW}.$$

In the above quantitative example, the second idle power consumption corresponding to the second possible input state vector determined by the backward determination is identified in block 430 as the lowest of the idle power consumptions.

Since the second idle power consumption corresponding to the second possible input state vector determined by the backward determination is lower than the first idle power consumption corresponding to the first possible input state vector determined by the forward determination, in block 440, the second possible input state vector is adopted as the input state vector for subsequent application to the circuit inputs of digital circuit 200 in an idle state. As a result, the input state vector, determined by the backward determination of a possible input state vector, is (X=1, Y=0, $C_{in}$=1).

The forward determination and the backward determination referred to in the preceding example are merely examples of two determinations of the states of the inputs of the circuit elements that can be performed. Other embodiments in accordance with the invention may employ various other types of determinations to determine the states of the inputs of the circuit elements. In one embodiment, one of the determinations is comprised of a forward determination that begins at a first location in the digital circuit and, as a result, proceeds through the digital circuit along a first path that extends away from the circuit inputs, and another of the determinations is comprised of a forward determination that begins at a second location, different from the first location, and, as a result, proceeds through the digital circuit along a path different from the first path. In another embodiment, one of the determinations is comprised of a backward determination that begins at a first location in the digital circuit and proceeds through the digital circuit along a first path that extends towards the circuit inputs, and another of the determinations is comprised of a backward determination that begins at a second location, different from the first location and, as a result, proceeds through the digital circuit along a path different from the first path. Additionally, determination types other than forward or backward determinations can be employed in block 410. Moreover, more than two determinations, each of which defines a respective possible input state vector, can be performed. Thus, it will be understood that embodiments of the method in accordance with the invention can perform various types of determinations in block 410.

Although embodiments of a method according to the invention have been described above using dynamic idle power values for the circuit elements that comprise the digital circuit, other embodiments of the method according to the invention can use static idle power values. Table 1 lists both static and dynamic idle power values for the exemplary 2-input NAND gate. Table 1 shows that dynamic idle power values can be quite different from static idle power values, for the reasons described above. Consequently, under real operating conditions, an input state vector defined using dynamic idle power values will typically result in a different power consumption in the idle state than one defined using static idle power values.

The dynamic idle power values shown in Table 1 may not be completely representative of an actual 2-input NAND gate, but are sufficiently accurate to show that static and dynamic idle power values can differ. Other embodiments according to the invention can use a combination of dynamic and static idle power values for the circuit elements that comprise the digital circuit to determine an input state vector that achieves low power consumption when applied to the circuit inputs of the digital circuit in an idle state. Such a combination of dynamic and static idle power values may depend on the particular operational environment for which the digital circuit is designed and to which it is exposed. The embodiments of the method described above with reference to FIGS. 1 and 4 can use static or dynamic or a combination of static and dynamic idle power values to define an input state vector that achieves low power consumption when applied to the circuit inputs of a digital circuit in an idle state.

The embodiments described above determine an input state vector for application to the circuit inputs of a digital circuit. More specifically, the embodiments determine an input state vector based upon a received description of the digital circuit, e.g., a computer code representation of the digital circuit generated by software sold under the trademark VERILOG® or VHDL®, or generated by software known as SPICE. The embodiment of the method to be described next identifies logically-permissible input connection alterations that could be made to the circuit elements of a digital circuit. The input connection alterations reduce the power consumption when the input state vector is applied to the circuit inputs of the digital circuit in an idle state. The method determines logically-permissible input connection alterations that can be made before the digital circuit is physically fabricated. Implementing such input connection alterations reduces the power consumption of the digital circuit when the input state vector is applied to the circuit inputs of the digital circuit in an idle state relative to that of the digital circuit prior to implementing the changes.

Figure 5:
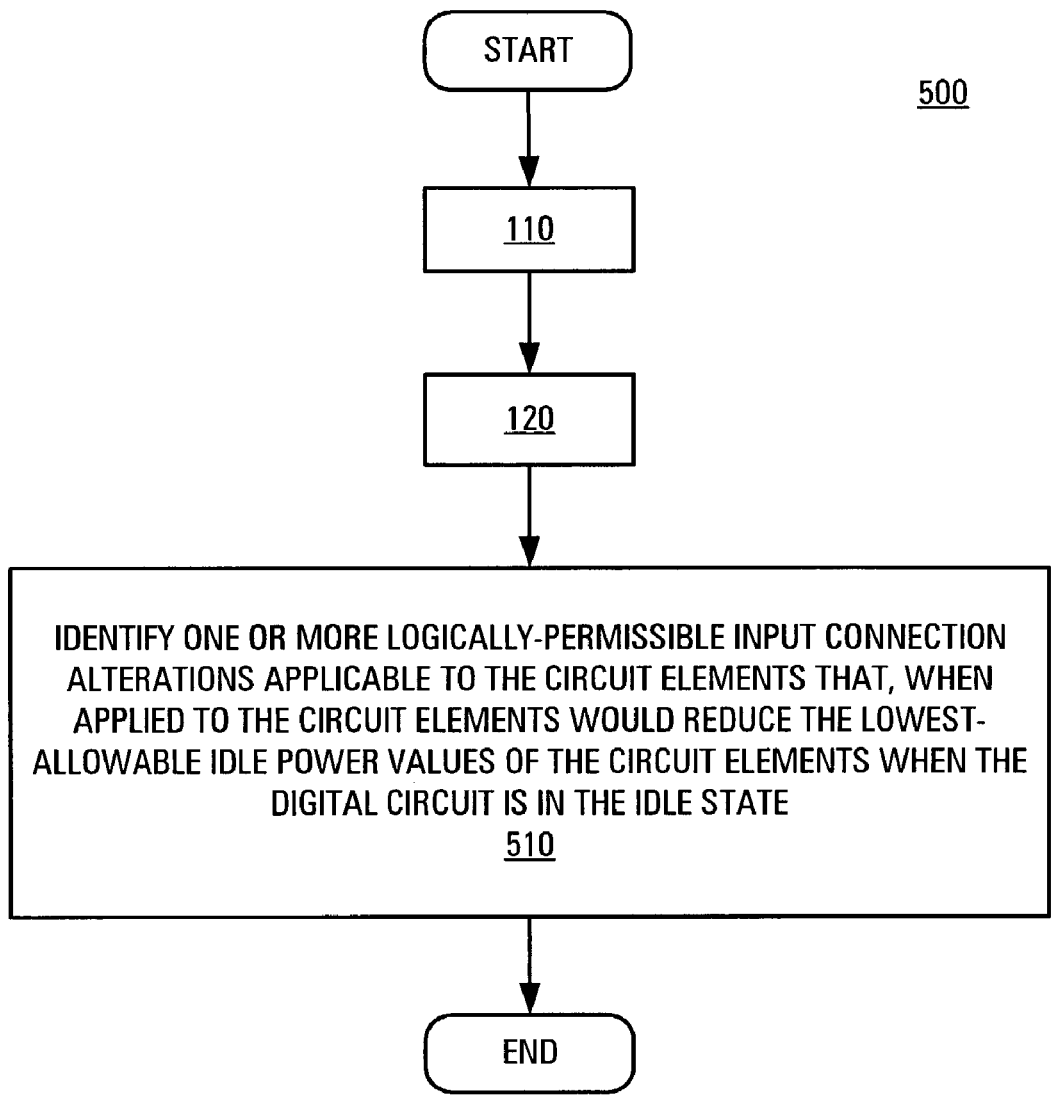
FIG. 5 is a flow diagram illustrating an embodiment of a method in accordance with the invention that determines logically-permissible input connection alterations for a circuit element in a digital circuit.

FIG. 5 is a flow chart showing an embodiment 500 of a method in accordance with the invention that identifies one or more logically-permissible input connection alterations that, when applied to the digital circuit, reduce the idle power consumption when the input state vector is applied to the circuit inputs of the digital circuit in an idle state. Elements of method 500 that correspond to elements of method 100 described above with reference to FIG. 1 are indicated using the same reference numerals and will not be described again here.

At 510, one or more logically-permissible input connection alterations are identified for the circuit elements that comprise the digital circuit. Such logically-permissible input connection alterations, when applied to the respective circuit elements, reduce the idle power values of the circuit elements when the input state vector is applied to the circuit inputs of the digital circuit in an idle state. The identified input connection alterations are logically-permissible in the sense that the logic functionality of the digital circuit is maintained when such input connection alterations are implemented.

For purposes of the present disclosure, the term "logically-permissible input connection alteration" refers to an alteration to the arrangement of the physical input connections of a circuit element. When permutations of the physical input connections of a circuit element are logically equivalent, the arrangement of the physical input connections of the circuit element can be altered without changing the logic of the digital circuit and hence is logically-permissible.

Referring still to block 510 shown in FIG. 5, logically-permissible alterations of the arrangement of the physical input connections of the circuit elements comprising the digital circuit are examined to determine which of the arrangements of the physical input connections achieves the lowest-allowable idle power value for the circuit element when the digital circuit is in an idle state. If the arrangement of the physical input connections giving the lowest-allowable idle power value for the circuit element is not the initial arrangement of the physical input connections, then the method indicates a proposed change to the arrangement of the physical input connections of the circuit element. By indicating such proposed logically-permissible input connection alterations, method 500 enables the arrangements of the physical input connections of the circuit elements of the digital circuit to be altered to achieve logically-permissible arrangements of the physical input connections that cause the respective circuit elements to have lowest-allowable idle power values lower than with the original arrangements of the physical input connections.

Figure 6A:
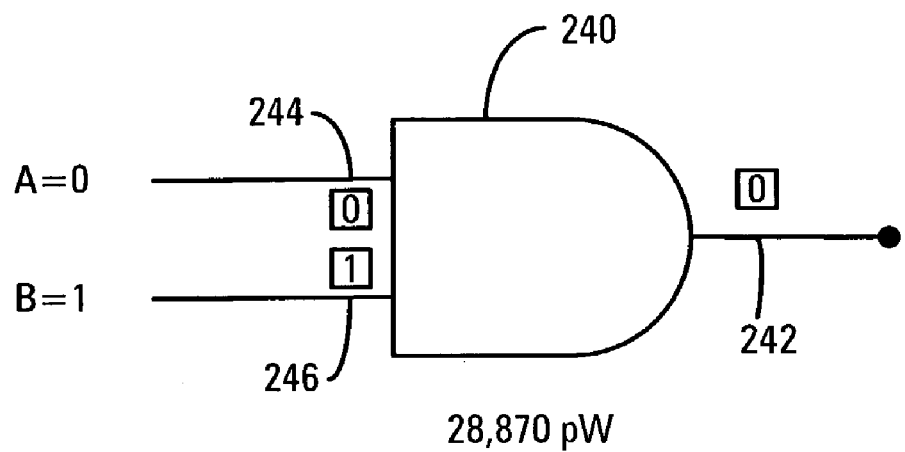
FIGS. 6A and 6B are block diagrams of a circuit element illustrating logically-equivalent arrangements of the physical input connections of the circuit element.
Figure 6B:
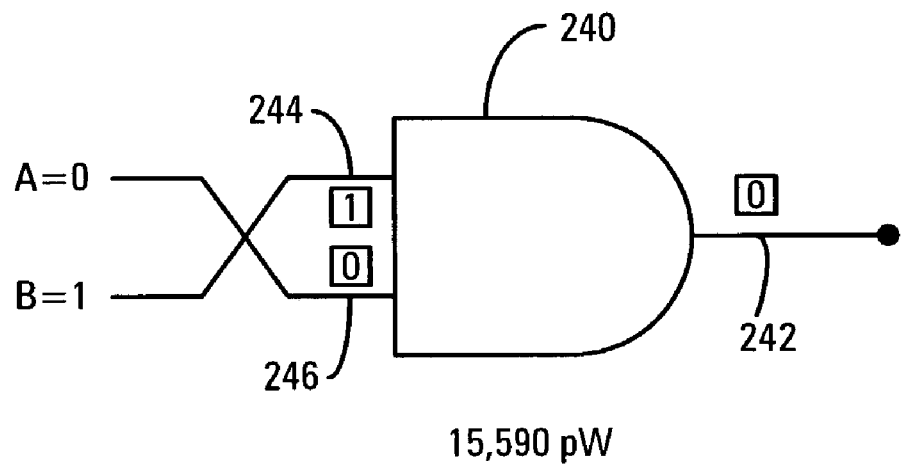

FIG. 6A shows AND gate 240 of the adder circuit 200 described above with reference to FIGS. 2 and 3. The backward determination described above with reference to FIG. 3 determines input states of (A=0, B=1) to be applied to physical inputs 244 and 246, respectively. Table 2 shows that applying input states of (A=0, B=1) to physical inputs 244 and 246, respectively, results in an idle power value of 28,870 pW for AND gate 240. However, AND gate 240 is an example of a circuit element that has logically-equivalent physical inputs. That is, input states of, for example, (A=0, B=1) applied to physical inputs 244 and 246, respectively, or to physical inputs 246 and 244, respectively, result in output 242 having the same state. FIG. 6A shows input state A applied to physical input 244 and input state B applied to physical input 246. FIG. 6B shows a logically-permissible alteration of the physical inputs of AND gate 240 in which input state B is applied to physical input 244 and input state A is applied to physical input 246. Table 2 shows that applying input states of (A=0, B=1) to physical inputs 246 and 244, respectively, of AND gate 240 results in an idle power value of 15,590 pW.

The method compares the idle power values for AND gate 240 between the arrangement of the physical input connections shown in FIG. 6A and that shown in FIG. 6B and, as in the case of this example, when the comparison indicates that the arrangement of the physical input connections shown in FIG. 6B provides a lower idle power value, the method indicates that changing the arrangement of the physical input connections of AND gate 240 to that shown in FIG. 6B would reduce the idle power value of AND gate 240 when the digital circuit is in the idle state without compromising the logic of the digital circuit.

While method 500 has been described with reference to an example applied to a two-input circuit element, the method can determine logically-permissible input connection alterations for circuit elements having more than two inputs. Appropriately interchanging logically-equivalent inputs of the circuit element can result in that circuit element having a lower idle power value. Altering the arrangement of the physical input connections of at least one of the circuit elements in a digital circuit can reduce the idle power consumption for a given input state vector applied to the circuit inputs of the digital circuit in an idle state. Thus, the invention not only provides a method for determining an input state vector that achieves low power consumption when applied to the circuit inputs of the digital circuit in an idle state, but additionally provides a method for determining logically-permissible input connection alterations that, when applied to the circuit elements that comprise the digital circuit, reduce the power consumption when the input state vector is applied to the circuit inputs of the digital circuit in an idle state.

Figure 7:
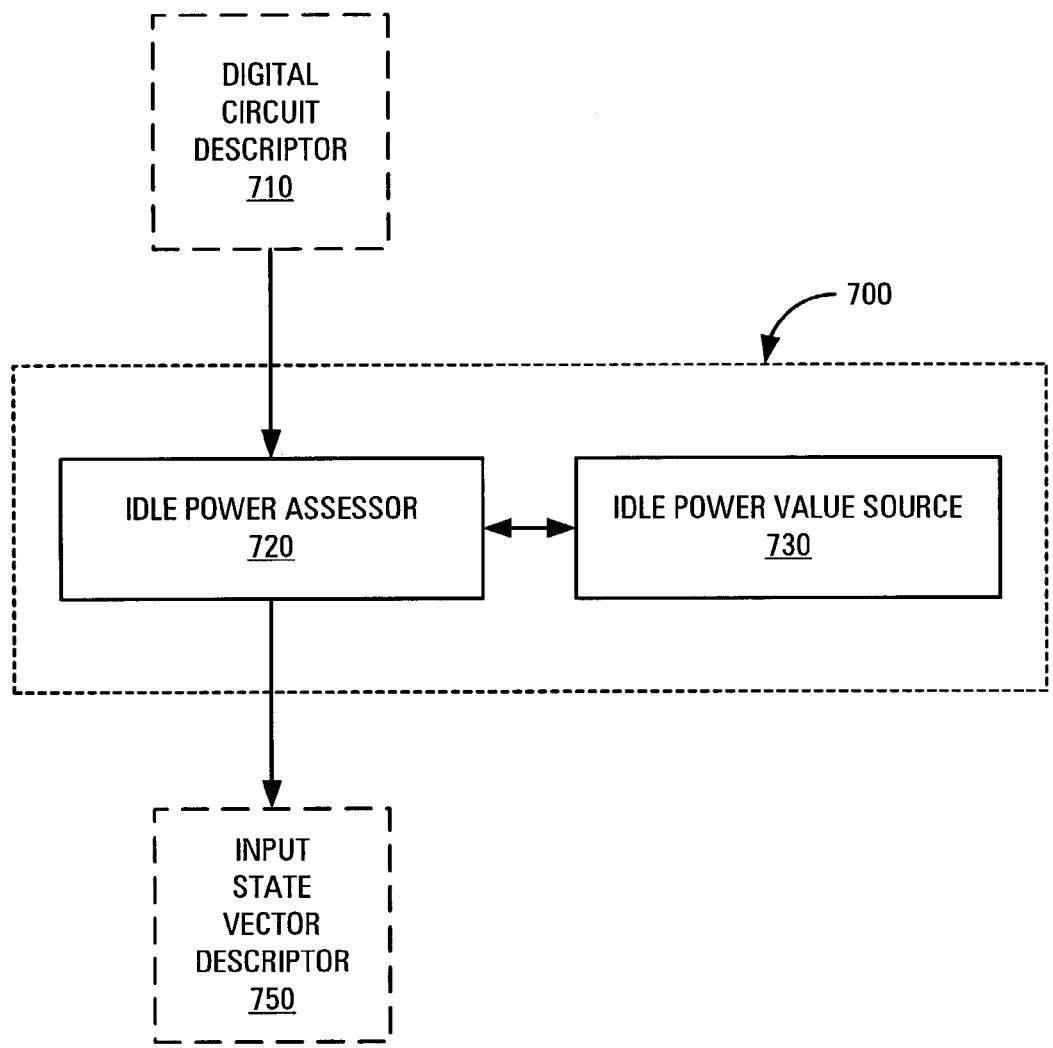
FIG. 7 is a block diagram of a first embodiment of an apparatus in accordance with the invention for defining an input state vector that achieves low power consumption when applied to the circuit inputs of a digital circuit in an idle state.

FIG. 7 is a block diagram of an exemplary embodiment 700 of an apparatus in accordance with the invention for defining an input state vector for application to the circuit inputs of a digital circuit in an idle state. Apparatus 700 defines an input state vector that achieves low power consumption when applied to the circuit inputs of the digital circuit in an idle state. Apparatus 700 receives a digital circuit descriptor 710 representing the digital circuit. Such a digital circuit descriptor 710 can be, for example, computer code representing the digital circuit. The apparatus generates an input state vector descriptor 750 that defines an input state vector that achieves low power consumption when applied to the circuit inputs of the digital circuit in an idle state.

Apparatus 700 comprises an idle power assessor 720 coupled to an idle power value source 730. Idle power value source 730 comprises memory capable of storing idle power values for the different circuit element types of the circuit elements that comprise the digital circuit. The idle power values for each circuit element type correspond to different states of the inputs of a circuit element of the circuit element type. In one embodiment, idle power value source 730 is structured as a look-up table. Idle power value source 730 may be integral with apparatus 700. Alternatively, idle power value source 730 may be located remotely from apparatus 700 and coupled to apparatus 700 by a communication link. The idle power values stored in the idle power value source for a given circuit element type may be static idle power values or dynamic idle power values or a combination of static idle power values and dynamic idle power values for a circuit element of the given circuit element type. Apparatus 700 additionally comprises an idle power assessor 720 coupled to idle power value source 730.

In response to digital circuit descriptor 710, idle power assessor 720 accesses the idle power values stored in idle power value source 730 and, for each circuit element that comprises the digital circuit, uses the stored idle power values for the circuit element type of the circuit element to determine states of the inputs of the circuit element that would set the circuit element to a lowest-allowable idle power state when the digital circuit is in an idle state. Moreover, idle power assessor 720 accounts for the logic constraints of the digital circuit when determining the states of the inputs. The states determined for those of the inputs that constitute the circuit inputs define the input state vector. An example of the processing performed by an embodiment of idle power assessor 720 is described in detail above with reference to block 120 of FIG. 1.

Figure 8:
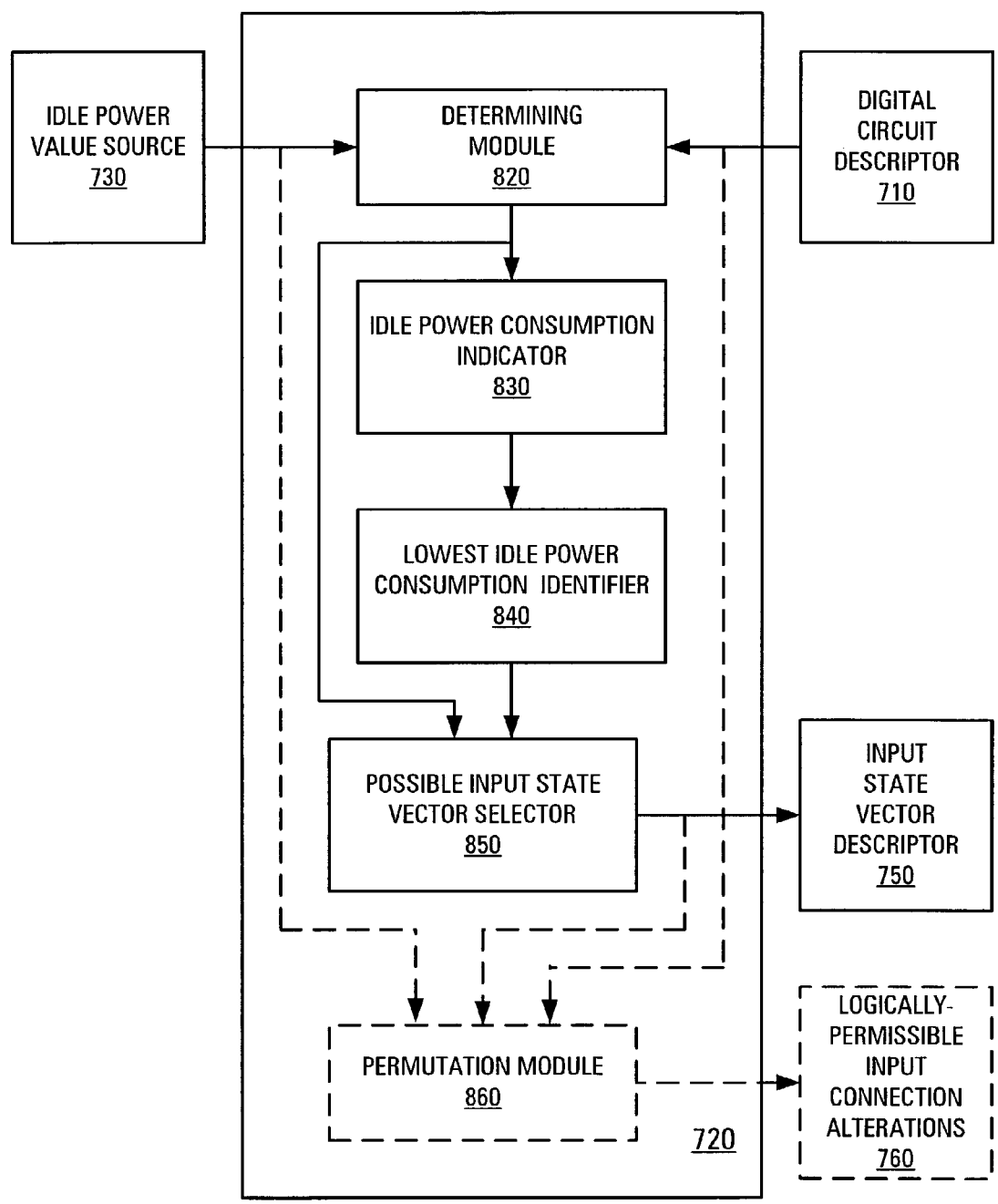
FIG. 8 is a block diagram of a second embodiment of an apparatus in accordance with the invention for defining an input state vector that achieves low power consumption when applied to the circuit inputs of a digital circuit in an idle state.

FIG. 8 is a block diagram showing an embodiment of the idle power assessor 720 of apparatus 700. Idle power assessor 720 generates input state vector descriptor 750 in response to digital circuit descriptor 710 and the idle power values stored in idle power value source 730. Input state vector descriptor 750 defines an input state vector that achieves low power consumption when applied to the circuit inputs of the digital circuit in an idle state. An example of the processing performed by an embodiment of idle power assessor 720 is described in detail above with reference to FIG. 4.

The embodiment of idle power assessor 720 shown in FIG. 8 is composed of a determining module 820, an idle power consumption indicator 830, an idle power consumption identifier 840 and a possible input state vector selector 850. Determining module 820 is coupled to idle power value source 720 and is connected to receive digital circuit descriptor 710. Idle power consumption indicator 830 is coupled to determining module 820. Lowest idle power consumption identifier 840 is coupled to idle power consumption indicator 830, and possible input state vector selector 850 is coupled to determining module 820 and idle power consumption identifier 840.

Determining module 820 is configured to perform determinations of the states of the inputs of the circuit elements of the digital circuit to define respective possible input state vectors. In an embodiment, determining module 820 performs the process illustrated in block 410 of FIG. 4.

Idle power consumption indicator 830 is configured to indicate an idle power consumption achieved by applying each of the possible input state vectors determined by determining module 820 to the circuit inputs of the digital circuit in the idle state. In an embodiment, idle power indicator 830 performs the process illustrated in block 420 of FIG. 4.

Lowest idle power identifier 840 is configured to identify the lowest of the idle power consumptions indicated by the idle power consumption indicator 830. In an embodiment, lowest idle power identifier 840 performs the process illustrated in block 430 of FIG. 4.

Possible input state vector selector 850 is configured to select the one of the possible input state vectors determined by determining module 820 as the input state vector.

The one of the possible input state vectors selected is that which corresponds to the lowest idle power consumption indicated by lowest idle power consumption indicator 830. In an embodiment, possible input state vector selector performs the process illustrated in block 440 of FIG. 4.

In an example of the operation of idle power assessor 720, determining module 820 performs one determination of the states of the inputs of the circuit elements by performing a forward determination to define a first possible input state vector. The determining module additionally performs another determination of the states of the inputs of the circuit elements by performing a backward determination to define a second possible input state vector. Idle power consumption indicator 830 indicates a first idle power consumption that is the power consumption of the digital circuit in the idle state when the first possible input state vector is applied to the circuit inputs. The idle power consumption indicator additionally indicates a second idle power consumption that is the power consumption of the digital circuit in the idle state when the second possible input state vector is applied to the circuit inputs. Lowest idle power consumption identifier 840 identifies the lower of the first idle power consumption and the second idle power consumption indicated by idle power consumption indicator 830. Possible input state vector selector 850 selects as the input state vector the one of the possible input state vectors that corresponds to the lower idle power consumption identified by the lowest idle power consumption identifier 840.

Although the foregoing example specifically mentions a forward determination and a backward determination as examples of the determinations performed by determining module 820, the determining module may additionally or alternatively perform various other determinations. In one embodiment, determining module 820 performs a forward determination that begins at a first location in the digital circuit and, as a result, determines the states of the inputs of circuit elements located along a first path through the digital circuit. In such embodiment, determining module 820 also performs a forward determination that begins at a location different the first location. As a result, the determining module determines the states of the inputs of circuit elements located along a path through the digital circuit different from the first path. In another embodiment, determining module 820 performs a backward determination that begins at a first location in the digital circuit and, as a result, determines the states of the inputs of circuit elements located along a first path through the digital circuit. In such embodiment, determining module 820 performs a backward determination that begins at a location different from the first location. As a result, the determining module determines the states of the inputs of circuit elements located along a path through the digital circuit different from the first path. Additionally or alternatively, the determining module can perform determination types other than forward or backward determinations. Thus, the determining module can perform determinations of various types as the determinations.

Apparatus 700 may additionally comprise an optional permutation module 860 that identifies logically-permissible input connection alterations 760 applicable to at least one of the circuit elements comprising the digital circuit. Apparatus 700 as described above operates to define an input state vector for application to the circuit inputs of a particular digital circuit. More specifically, apparatus 700 defines an input state vector based upon a received digital circuit descriptor, such as a computer code representation of the digital circuit generated by software sold under the trademark VERILOG® or VHDL®, or generated by software known as SPICE. Permutation module 860 in accordance with the invention identifies logically-permissible input connection alterations that could be made to at least one of the circuit elements of the digital circuit to reduce the idle power consumption of the digital circuit in an idle state when the input state vector is applied to the circuit inputs. Thus, permutation module 860 identifies changes, i.e., logically-permissible input connection alterations, that can be made before the digital circuit is physically fabricated. Such changes will reduce the idle power consumption of the digital circuit in an idle state when the input state vector is applied to the circuit inputs compared to the idle power consumption of the unchanged digital circuit.

Permutation module 860 identifies logically-permissible input connection alterations for at least one of the circuit elements that reduce the idle power value of that circuit element when the digital circuit is in the idle state. The logically-permissible input connection alterations of that circuit element can be applied while maintaining the logic of the digital circuit.

As described above with reference to FIGS. 5, 6A and 6B, altering the input connections of the physical inputs of a circuit element in a digital circuit is possible when various physical input connection arrangements of the circuit element are logically equivalent. More specifically, the physical input connection arrangements of some types of circuit elements can be interchanged without any logical consequence, and the interchange may yield a reduction in the idle power value of that circuit element when the input state vector is applied to the circuit inputs of the digital circuit.

Embodiments of apparatus 700 may be constructed from discrete components, small-scale or large-scale integrated circuits, suitably-configured application-specific integrated circuits (ASICs) and other suitable hardware. Alternatively, embodiments of the apparatus and the modules thereof may be constructed using a digital signal processor (DSP), microprocessor, microcomputer or computer with internal or external memory operating in response to an input state vector defining program fixed in a computer-readable medium in accordance with the invention. A device, such as a DSP, a microprocessor, microcomputer or computer, capable of executing an input state vector defining program will be referred to herein as a computer.

In computer-based embodiments of apparatus 700, the various modules described above may be ephemeral, and may only exist temporarily as the input state vector defining program executes. In such embodiments, the input state vector defining program could be conveyed to the computer on which it is to run by embodying the program in a suitable computer-readable medium, such as a set of floppy disks, a CD-ROM, a DVD-ROM, a read-only memory. Alternatively, the input state vector defining program could be transmitted to such computer by a suitable data link and be stored in a memory device in the computer.

The input state vector defining program causes the computer on which it runs to perform a method for defining an input state vector for application to the circuit inputs of a digital circuit to achieve low idle power consumption. The methods performed by the computer in response to the input state vector defining program are substantially similar to those described above with reference to FIGS. 1, 4 and 5.

Table 3 shows an exemplary pseudo-code that implements an embodiment of the methods shown in FIGS. 1 and 4 to define an input state vector that achieves low power consumption when applied to the circuit inputs of a digital circuit in an idle state.

TABLE 3

Definition of an Input State Vector that Achieves Low Power Consumption When Applied to the Circuit Inputs of a Digital Circuit in an Idle State {
For every clock-gated combinational block in the digital circuit
{
  For each output signal in the combinational block
  {
  Determine the segment of the circuit that generates
    the output signal;
  }
  For all segments in the circuit (working backwards)
  {
    Choose the segment with the largest number of
      circuit elements;
    Assign input states corresponding to lowest idle
      power to each circuit element starting from
      the output, accounting for logic constraints of
      the difital circuit;
    If the input states corresponding to lowest idle power
      cannot be assigned due to logic conflicts,
      assign input states corresponding to the next-
      lowest idle power;
    Continue till all inputs in the segment are accounted
      for and propagate the outputs to other
      segments if necessary;
    Choose the segment with the next-largest number of
      circuit elements;
  }
  Adopt the states of the inputs of the circuit elements whose
    inputs constitute the circuit inputs as a first possible
    input state vector;
  Compute idle power consumption $P_1$ for first possible input
    state vector;
  For all segments in the circuit (working forwards)
  {
    Choose the segment with the largest number of
      circuit elements;
    Assign input states corresponding to lowest idle
      power to each circuit element starting from
      the circuit inputs, accounting for the logic
      constraints of the digital circuit;
    If input states corresponding to the lowest idle power
      cannot be assigned due to logic conflicts,
      assign inputs states corresponding to the next-
      lowest allowed idle power;

TABLE 3-continued

Definition of an Input State Vector that Achieves Low Power Consumption When Applied to the Circuit Inputs of a Digital Circuit in an Idle State

```
        Continue till all inputs in the segment are accounted
            for and propagate the outputs to other
            segments if necessary;
        Choose the segment with the next-largest number of
            circuit elements;
        }
        Adopt the states of the inputs of the circuit elements whose
            inputs constitute the circuit inputs as a second
            possible inputs state vector;
        Compute an idle power consumption P₂ for the second
            possible inputs state vector;
    }
    If P₁ < P₂
        Input state vector = first possible input state vector
    else
        Input state vector = second possible input state vector
    Use presettable and clearable flip-flops to apply the ones and zeros,
        respectively, of the input state vector to the circuit inputs of
        the digital circuit in the idle mode;
}
```

Digital circuits typically include flip-flops at each circuit input to control the timing with which the input states are applied to the digital circuit. D-type flip-flops with power-on clear are typically employed. Each flip-flop receives respective input states and a clock signal. The input state is applied to the circuit input on, for example, the rising edges of the clock signal.

Digital circuits also typically employ clock gating to set them into idle mode. The clock signal is received via a gate that additionally receives an inverted IDLE control signal. The output of the gate is connected to the clock inputs of the flip-flops and any other circuit elements that need a clock signal. When the IDLE control signal is not asserted, the gate feeds the clock signal to the flip-flops and such other circuit elements. Assertion of the IDLE control signal prevents the gate from feeding the clock signal to the flip-flops and such other circuit elements. The IDLE control signal sets the digital circuit to a static state in which its power consumption is substantially reduced compared with its power consumption during its normal, active state. This static state is called the idle state of the digital circuit in this disclosure.

Figure 9:
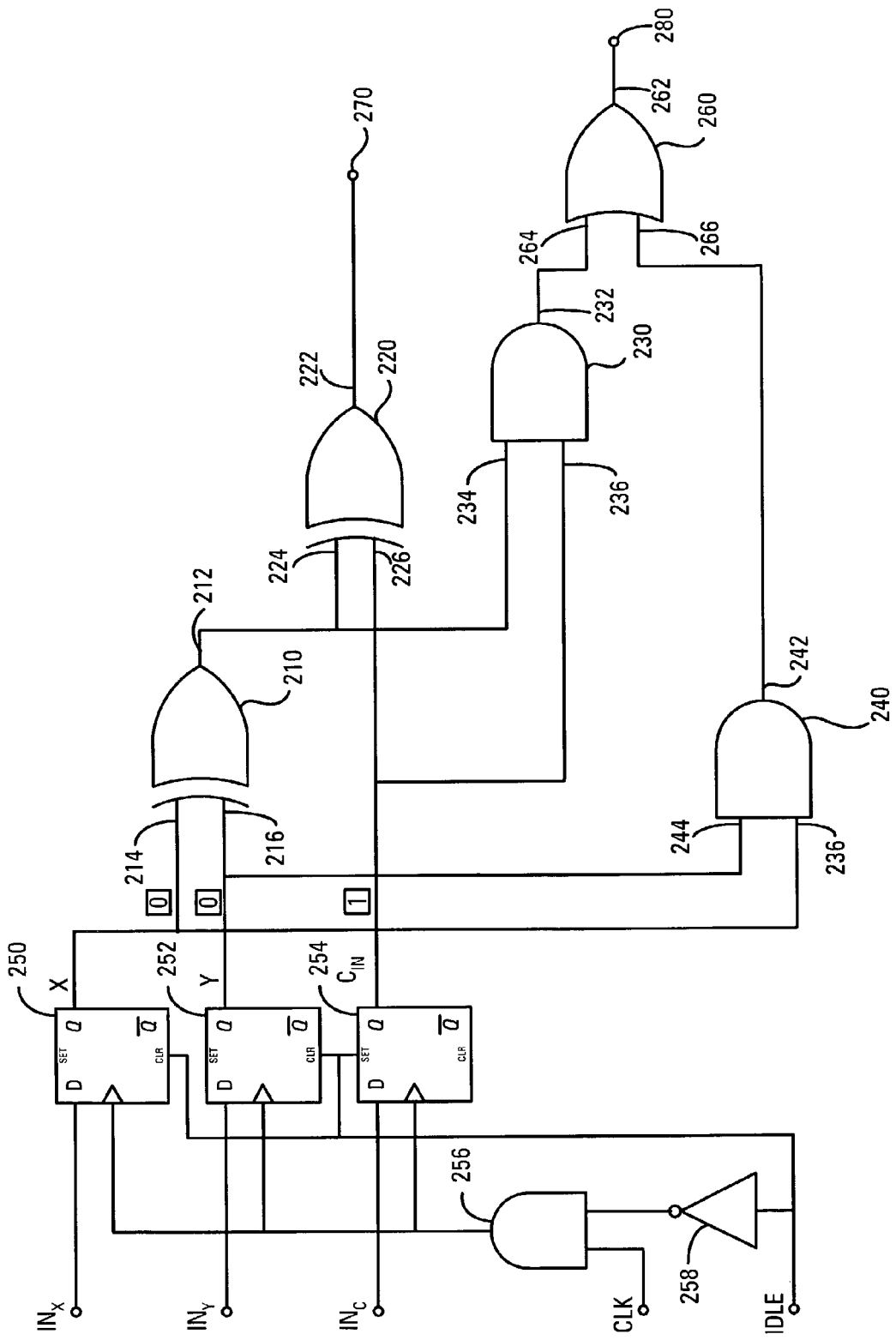
FIG. 9 is a schematic diagram of an exemplary digital circuit illustrating the use of specific types of flip-flops for applying the input state vector to the circuit inputs of the digital circuit.

FIG. 9 is a schematic diagram of the exemplary adder digital circuit 200 shown in FIG. 2 that incorporates presettable and clearable D-type flip-flops 250, 252 and 254 that apply the input state vector to the circuit inputs X, Y and $C_{in}$ of digital circuit 200 to achieve low power consumption when the digital circuit is in the idle state. The type of D-type flip-flop used to apply each state of the input state vector to the respective circuit input depends on the input state to be applied. A clearable D-type flip-flop applies a zero state to the respective circuit input whereas a presettable D-type flip-flop applies a one state to the respective circuit input. Clearable and presettable D-type flip-flop designs exist in typical cell libraries used for designing digital circuits, so the development, characterization and optimization of the flip-flops used to apply the input state vector to the circuit inputs has already been done. In one example, the clear (CLR) and preset (PRE) inputs of the clearable and presettable D-flip-flops are asynchronous, so that applying the IDLE control signal to the clear or preset input of the flip-flop, depending on the type of the flip-flop, sets the Q output of the flip-flop to a zero state or a one state, respectively, regardless of the state of the clock signal. Using presettable and clearable D-type flip-flops to apply the defined input state vector to the circuit inputs has the advantage that no change in design methodology is required to apply the input state vector to the circuit inputs.

FIG. 9 shows an example in which the input state vector (X=0, Y=0, $C_{in}$=1) determined by the example of the method described above with reference to FIG. 2 is applied to the circuit inputs of digital circuit 200. The Q outputs of D-type flip-flops 250, 252 and 254 are connected to the circuit inputs X, Y and $C_{in}$, respectively. To apply the exemplary input state vector X=0, Y=$_0$, $C_{in}$=1, flip-flops 250 and 252, which apply zero states to circuit inputs X and Y, respectively, are clearable D-type flip-flops, and flip-flop 254, which applies a one state to circuit input $C_{in}$, is a presettable D-type flip-flop. The D inputs of the flip-flops are connected to inputs $IN_X$, $IN_Y$ and $IN_C$, respectively. The clock inputs of the flip-flops are connected to the output of gate 256. The clear inputs CLR of flip-flops 250 and 252, the preset input SET of flip-flop 254 and the input of inverter 258 are all connected to receive the IDLE control signal. The output of the inverter is connected to one input of gate 256. The other input of gate 256 is connected to receive clock signal CLK. In an embodiment in which the input state vector (X=0, Y=1, $C_{in}$=1) determined by the example of the method described above with reference to FIG. 3 is applied to the circuit inputs of digital circuit 200, a presettable D-type flip-flop is used instead of a clearable D-type flip-flop as flip-flop 250.

In the active state of digital circuit 200, the IDLE control signal is not asserted. The inverse of the IDLE control signal fed to one input of gate 256 from the output of inverter 258 allows the clock signal CLK to pass through the gate to the clock inputs of flip-flops 250, 252 and 254. As a result, the flip-flops pass input states received at inputs $IN_X$, $IN_Y$ and $IN_C$ to circuit inputs X, Y, and Cin, respectively, on the rising edges, for example, of the clock signal.

Assertion of the IDLE control signal sets digital circuit 200 into its idle state. The inverse of the IDLE control signal fed to one input of gate 256 from the output of inverter 258 causes the gate to prevent the clock signal CLK from passing to the clock inputs of flip-flops 250, 252 and 254. This sets digital circuit 200 to its idle state. Power consumption of digital circuit 200 in the idle state is less than in the active state, but, absent application of the input state vector to the circuit inputs, depends on the operational state of the circuit just before the IDLE control signal was asserted. The IDLE control signal applied to the clear inputs CLR of flip-flops 250 and 252 and to the preset input SET of flip-flop 254 sets the Q outputs of flip-flops 250 and 252 to the zero state and sets the Q output of flip-flop 254 to the one state. This applies the input state vector defined as described above to the circuit inputs X, Y, and Cin of digital circuit 200. The input state vector applied to the circuit inputs achieves low power consumption in digital circuit 200 in the idle mode.

In an example of digital circuit 200 implemented in 0.25 μm CMOS technology, results of a SPICE simulation show that applying the input state vector reduces the idle power consumption by a factor of more than two.

Embodiments according to the invention define an input state vector that, when applied to the circuit inputs, achieves low power consumption when the digital circuit is in an idle state. Such embodiments can be used to define an input state vector applicable to any type of digital circuit, such as digital circuits comprising complementary metal oxide semiconductor (CMOS) transistors. In addition, other embodiments will define an input state vector that, when applied to the circuit inputs of a digital circuit constructed using any type of switching circuit element, e.g., any transistor type, achieves low power consumption when the digital circuit is in an idle state.

This disclosure describes the invention in detail using illustrative embodiments. However, it is to be understood that the invention defined by the appended claims is not limited to the precise embodiments described.

We claim:

1. Apparatus for defining an input state vector for application to circuit inputs of a digital circuit to achieve low power consumption when said digital circuit is in an idle state, said digital circuit comprising one or more circuit elements of respective circuit element types, said apparatus comprising:
   an idle power value source having idle power values stored therein, said idle power values including idle power values for each one of said circuit element types, said idle power values for said one of said circuit element types corresponding to different digital states of the inputs of a circuit element of said one of said circuit element types; and
   an idle power assessor coupled to said idle power value source, said idle power assessor operable to use said idle power values to determine, for each one of said circuit elements, digital states of the inputs of said one of said circuit elements that would set said one of said circuit elements to a lowest-allowable idle power state when said digital circuit is in said idle state, said determining accounting for logic constraints of said digital circuit, said states determined for ones of said inputs that constitute said circuit inputs defining said input state vector.

2. The apparatus of claim 1, in which said idle power assessor is operable to divide said digital circuit into segments and to perform said determining for each of said segments.

3. The apparatus of claim 2, in which said segments are comprised of fan-in cones.

4. The apparatus of claim 1, in which said idle power assessor is operable to determine said digital states of said inputs of said circuit elements working through said digital circuit along a path extending away from said circuit inputs.

5. The apparatus of claim 1, in which said idle power assessor is operable to determine said digital states of said inputs of said circuit elements working through said digital circuit along a path extending towards said circuit inputs.

6. The apparatus of claim 1, in which said idle power assessor comprises:
   a determining module configured to perform determinations of said digital states of said inputs of said circuit elements to define respective possible input state vectors;
   an idle power consumption indicator coupled to said determining module and configured to indicate respective idle power consumptions achieved by applying each of said possible input state vectors to said circuit inputs of said digital circuit in said idle state;
   a lowest idle power consumption identifier coupled to said idle power consumption indicator and configured to identify the lowest of said idle power consumptions; and
   a possible input state vector selector coupled to said lowest idle power consumption identifier and said determining module, said input state vector selector configured to select the one of said possible input state vectors corresponding to said lowest idle power consumption identified by said lowest idle power consumption identifier as said input state vector.

7. The apparatus of claim 6, in which said determining module is configured to perform a forward determination in which said digital states of said inputs of said circuit elements are determined working through said digital circuit along a path extending away from said circuit inputs as one of said determinations.

8. The apparatus of claim 6, in which said determining module is configured to perform a backward determination in which said digital states of said inputs of said circuit elements are determined working through said digital circuit along a path extending towards said circuit inputs as one of said determinations.

9. The apparatus of claim 1, in which said idle power values stored in said idle power value source correspond to dynamic operation of said circuit elements.

10. Apparatus for defining an input state vector for application to circuit inputs of a digital circuit to achieve low power consumption when said digital circuit is in an idle state, said digital circuit comprising one or more circuit elements of respective circuit element types, said apparatus comprising:
    an idle power value source having idle power values stored therein, said idle power values including idle power values for each one of said circuit element types, said idle power values for said one of said circuit element types corresponding to different states of the inputs of a circuit element of said one of said circuit element types; and
    an idle power assessor coupled to said idle power value source, said idle power assessor comprising a permutation module configured to identify one or more logically-permissible input connection alterations applicable to said circuit elements of said digital circuit that, when applied to said circuit elements, would reduce said lowest-allowable idle power states of said circuit elements when said digital circuit is in said idle state.

11. A method for defining an input state vector that achieves low power consumption when applied to circuit inputs of a digital circuit in an idle state, said digital circuit comprising one or more circuit elements of respective circuit element types, said method comprising:
    accessing stored idle power values including idle power values for each one of said circuit element types, said idle power values for said one of said circuit element types corresponding to different digital states of the inputs of a circuit element of said one of said circuit element types; and
    for each one of said circuit elements, determining from said stored idle power values digital states of the inputs of said one of said circuit elements that would set said one of said circuit elements to a lowest-allowable idle power state when said digital circuit is in said idle state, said determining accounting for logic constraints of said digital circuit, said states determined for ones of said inputs that constitute said circuit inputs defining said input state vector.

12. The method as recited in claim 11, in which said determining comprises:
    dividing said digital circuit into segments; and
    determining said digital state of said inputs of ones of said circuit elements located in each of said segments.

13. The method as recited in claim 12, in which said segments are comprised of fan-in cones.

14. The method as recited in claim 11, in which said determining comprises performing a forward determination in which said digital states of said inputs of said circuit elements are determined working through said digital circuit along a path extending away from said circuit inputs.

15. The method as recited in claim 11, in which said determining comprises performing a backward determination in which said digital states of said inputs of said circuit elements are determined working through said digital circuit along a path extending towards said circuit inputs.

16. The method as recited in claim 11, in which said determining comprises:
  performing determinations of said digital states of said inputs of said circuit elements to define respective possible input state vectors;
  indicating respective idle power consumptions achieved by applying each of said possible input state vectors to said circuit inputs;
  identifying the lowest of said idle power consumptions; and
  adopting the one of said possible input state vectors corresponding to said lowest of said idle power consumptions as said input state vector.

17. The method as recited in claim 16, in which said performing comprises determining said digital states of said inputs of said circuit elements working through said digital circuit along a path extending away from said circuit inputs.

18. The method as recited in claim 16, in which said performing comprises determining said digital states of said inputs of said circuit elements working through said digital circuit along a path extending towards said circuit inputs.

19. The method as recited in claim 11, additionally comprising identifying logically-permissible input connections applicable to said circuit elements comprising said digital circuit that, when applied to said circuit elements, would reduce said lowest-allowable idle power states of said circuit elements when said digital circuit is in said idle state.

20. The method as recited in claim 11, in which said stored idle power values for said one of said circuit element types correspond to dynamic operation of said circuit element of said one of circuit element types.

21. A computer-readable medium having stored thereon computer-readable instructions for causing a computer to perform a method for defining an input state vector for application to circuit inputs of a digital circuit to achieve low idle power consumption when said digital circuit is in an idle state, said digital circuit comprising one or more circuit elements of respective circuit element types, said method comprising:
  accessing stored idle power values, said stored idle power values including idle power values for each one of said circuit element types, said idle power values for said one of said circuit element types corresponding to different digital states of the inputs of a circuit element of said one of said circuit element types; and
  for each one of said circuit elements comprising said digital circuit, determining from said stored idle power values, digital states of said inputs of said one of said circuit elements that would set said one of said circuit elements to a lowest-allowable idle power state when said digital circuit is in said idle state, said determining accounting for logic constraints of said digital circuit, said digital states determined for ones of said inputs that constitute said circuit inputs defining said input state vector.

22. The computer-readable medium of claim 21, in which said determining additionally comprises:
  dividing said digital circuit into segments; and
  determining said digital state of said inputs of ones of said circuit elements located in each of said segments.

23. The computer-readable medium of claim 22, in which said segments are comprised of fan-in cones.

24. The computer-readable medium of claim 21, in which said determining comprises performing a forward determination in which said digital states of said inputs of said circuit elements are determined working through said digital circuit along a path extending away from said circuit inputs.

25. The computer-readable medium of claim 21, in which said determining comprises performing a backward determination in which said digital states of said inputs of said circuit elements are determined working through said digital circuit along a path extending towards said circuit inputs.

26. The computer-readable medium of claim 21, in which said determining comprises:
  performing determinations of said digital states of said inputs of said circuit elements to define respective possible input state vectors;
  indicating respective idle power consumptions achieved by applying each of said possible input state vectors to said circuit inputs;
  identifying the lowest of said idle power consumptions; and
  adopting the one of said possible input state vectors corresponding to said lowest of said idle power consumptions as said input state vector.

27. The computer-readable medium of claim 26, in which said performing comprises determining said digital states of said inputs of said circuit elements working through said digital circuit along a path extending away from said circuit inputs.

28. The computer-readable medium of claim 26, in which said performing comprises determining said digital states of said inputs of said circuit elements working through said digital circuit along a path extending towards said circuit inputs.

29. The computer-readable medium of claim 21, in which said method additionally comprises identifying logically-permissible input connections applicable to said circuit elements comprising said digital circuit that, when applied to said circuit elements, would reduce said lowest-allowable idle power states of said circuit elements when said digital circuit is in said idle state.

* * * * *